United States Patent
Gastesi

[19]
[11] Patent Number: 5,941,331
[45] Date of Patent: Aug. 24, 1999

[54] AIR CUSHION VEHICLE CONTROL SYSTEM

[76] Inventor: Ignacio Gastesi, Rte. 1, Box 591, Scottsville, Va. 24590

[21] Appl. No.: 08/691,583

[22] Filed: Aug. 2, 1996

Related U.S. Application Data

[63] Continuation-in-part of application No. 08/319,668, Oct. 7, 1994, abandoned, which is a continuation-in-part of application No. 08/159,508, Nov. 30, 1993, abandoned, which is a continuation-in-part of application No. 07/835,628, Feb. 13, 1992, abandoned.

[51] Int. Cl.$^6$ ........................................................ B60V 1/04
[52] U.S. Cl. ............................ 180/120; 180/124; 180/127
[58] Field of Search ...................... 180/117, 116, 180/120, 121, 122, 130, 119, 127, 128, 124

[56] References Cited

U.S. PATENT DOCUMENTS

| | | | |
|---|---|---|---|
| 3,066,753 | 12/1962 | Hurley et al. | 180/120 |
| 3,173,509 | 3/1965 | Wernicke et al. | 180/120 |
| 3,208,543 | 9/1965 | Crowley | 180/120 |
| 3,342,278 | 9/1967 | Cocksedge | 180/122 |
| 3,587,771 | 6/1971 | Faure | 180/117 |
| 3,608,662 | 9/1971 | Ferguson | 180/117 |
| 3,612,208 | 10/1971 | Ferguson | 180/120 |
| 3,861,491 | 1/1975 | Ferguson | 180/120 |
| 3,869,020 | 3/1975 | Holland | 180/120 |

FOREIGN PATENT DOCUMENTS

| | | | |
|---|---|---|---|
| 1579514 | 8/1969 | France | 180/120 |

*Primary Examiner*—Anne Marie Boehler

[57] ABSTRACT

Control of air cushion vehicles is obtained by controlling the translation of the vehicle independently from control of the rotation (yaw). Lateral translation of the vehicle is controlled by creating side-directed thrusts the direction of which passes through or as close as possible to the yaw axis by diverting variably controllable flows of air from the flow of air used to create a propulsive air thrust for forward translation of the vehicle to left and right lateral control ports located more or less parallel to the fore-aft axis of the vehicle sufficiently proximate to a plane which passes through the yaw axis and is perpendicular to the fore-aft axis of the vehicle so that diverted air flows exiting the ports approximately perpendicular to the fore-aft axis create thrusts which predominantly pass through the yaw axis. (In the absence of external forces the yaw axis passes through the center of gravity of the vehicle.) The rotation or yaw of the vehicle is controlled by creating controlled moments with respect to the yaw axis with a directionally orientable thrust located at a different point from the lateral control ports, preferably as far as is practical from the yaw axis, usually near the stern. The air flow which is used to propel, steer, slow or stop the vehicle in accordance with the invention, the "control air flow", is controlled by a control air distributor. The method of the invention has the advantage of greater and easier vehicle control as compared to methods which rely on the vehicle's yaw for translation control by control of yaw angle.

18 Claims, 12 Drawing Sheets

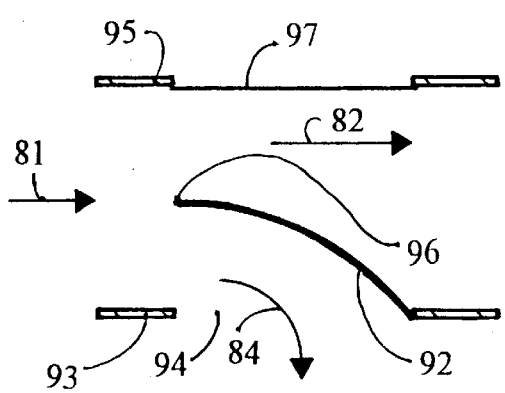
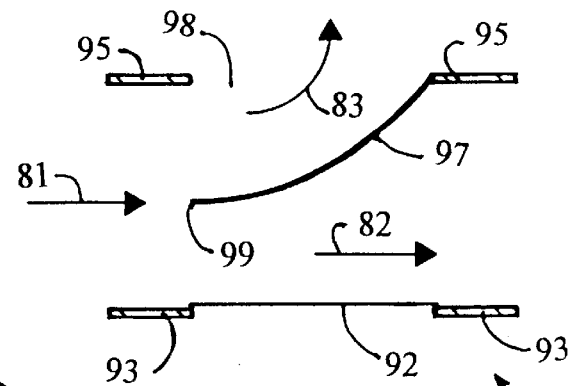
FIG.7A FIG.7B
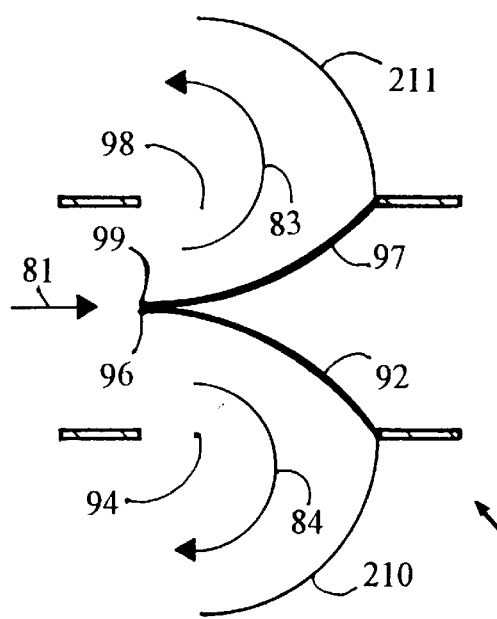
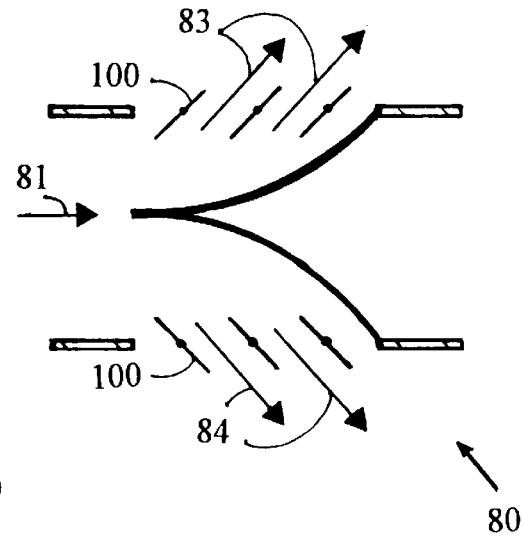
FIG.7C FIG.7D

AIR CUSHION VEHICLE CONTROL SYSTEM

This application is a continuation-in-part of application Ser. No. 08/319,668, filed Oct. 7, 1994, entitled "Air Cushion Vehicle Control System", now abandoned, which is a continuation-in-part of application Ser. No. 08/159,508, filed Nov. 30, 1993, entitled "Air Cushion Vehicle Control System", now abandoned, which in turn is a continuation-in-part of application Ser. No. 07/835,628, filed Feb. 13, 1992, entitled "Hovercraft Device", now abandoned.

FIELD OF THE INVENTION

This invention relates to a method and apparatus for controlling ground effect or air cushion vehicles, often referred to as "Hovercraft®", and an embodiment of the method and apparatus in an air cushion vehicle formed of components which are readily disassembled and reassembled and are uniquely capable of being collapsed to a compact unit which may be transported without the use of a trailer or other special equipment.

BACKGROUND OF THE INVENTION

Air cushion vehicles, commonly referred to by the trademark "Hovercraft®" have been available for many years and have found many applications. These devices are also known as surface effect machines, ground effect vehicles and airborne surface vehicles. The term "air cushion vehicle" as used herein is intended to be synonymous with the other terms of art used for this class of vehicles. Since they move on a cushion of air, they can maneuver over water and most terrains. Air cushion vehicles can easily traverse terrains from asphalt to quicksand and can be used for tasks ranging from their well-known use as high-speed water transportation for people, vehicles and freight to ice or flood rescue and harvesting cranberries. Since an air cushion vehicle travels on a cushion of air it reduces or eliminates damage to ground surfaces. This makes it the transport of choice when avoidance of environmental damage is of concern. An air cushion vehicle also can travel on surfaces which are not otherwise easily traversable such as thin ice, swamps and marshes.

In general air cushion vehicles utilize an arrangement for producing a cushion of air under pressure beneath the vehicle so as to raise the vehicle a short distance from the supporting surface (the surface being traversed).

When it is raised from the supporting surface an air cushion vehicle is essentially floating on air and the propelling and steering means must be designed to take this into account. Many means have been provided in the past for providing thrusts in different directions to propel the vehicle forward, to brake forward motion or produce rearward motion and to turn the vehicle.

It can be seen that the basic requirements for propulsion are:
a) thrust generation to propel the vehicle at the speeds desired;
b) generation of sufficient thrust to provide for acceleration and deceleration to ensure that the craft is maneuverable and safe to operate; and
c) the ability to vector thrust to provide directional control.

In smaller vehicles, integration of propulsion with the lift system conserves energy and minimizes the power system required. A combination of lift, propulsion and control in a single system affords a desirable design flexibility which affords simplicity and lower cost.

Control systems for yaw, side force and speed control usually have taken one of the following forms:
a) fins installed aft with rudders (yaw control only);
b) differential thrust (with multi-propeller vehicles), including multiple swiveling propellers or ducted fans;
c) swiveling bow thrusters;
d) puff ports;
e) propulsive force from the lift system with rudders installed in an outlet jet (and reverse thrust buckets for braking);
f) skirt lining and
g) surface contact devices such as retractable rods which create drag for braking and turning.

Aerodynamic control surfaces have been used in air cushion vehicles primarily for providing directional control by creating yaw moments. They have not been widely used because they are rather inefficient at the low speeds and large yaw angles which are often encountered in operation. This has led to placement of control surfaces in the slipstream of the propeller or fan used for propulsion, where their effectiveness is considerably improved. With a single propeller the rudder is commonly at the rear. With propellers and their respective engines mounted fore and aft on the vehicle, individual rudders may be located behind each propeller for steering.

In some skirt lift arrangements vanes in the peripheral skirt are controlled to change the direction of the air issuing therefrom. In others, a supply chamber for delivering pressurized air to a peripheral air curtain is provided with vanes on the sides and at the front and rear; and the vanes are controlled to produce movement of the vehicle in the desired direction.

If an air cushion machine is operating at the proper angle to the surface being traversed, horizontally or slightly nose-up, it is said to be properly trimmed. The trim or attitude of large air cushion vehicles is sometimes adjusted by changing inner skirt attachments to change the center of pressure of the air cushion and thus cause the vehicle to roll or pitch as desired. Longitudinal trim may also be adjusted by adding or shifting water or fuel (ballast) from one location to another. In small machines such devices are too cumbersome to include and the driver and any passengers move about to adjust trim. They must constantly shift their weight to assist the machine while accelerating, decelerating or banking into turns, in order to prevent the vehicle from nose-diving or becoming airborne.

Heretofore, it has been believed to be highly desirable for proper control of an air cushion vehicle to provide steering forces at both the front and the rear of the vehicle. This arrangement permits control in crosswinds and facilitates fairly quick turning about a reasonably small radius, but in practice this requires designing and operating a complex machine. Consequently a better method for control (steering) of air cushion vehicles would be highly desirable.

Many patents have appeared claiming improvements to air cushion vehicles. U.S. Pat. No. 3,173,509 to Wernicke et al. discloses a method for steering air cushion vehicles by directing air blasts through discharge ports placed at opposite corners fore and aft of the yaw axis of the vehicle. U.S. Pat. No. 5,042,605 to Moriwake utilizes two rudders placed downstream in the airstream of a ducted fan to effect steering.

U.S. Pat. No. 4,122,909 to Fair et al., U.S. Pat. No. 4,111,276 to Rapson et al., U.S. Pat. No. 3,409,103 to Tripp et al., U.S. Pat. No. 3,420,330 to Bliss and U.S. Pat. No. 3,384,197 to Bingham et al. disclose improved retaining skirts. Brake and stabilizer improvements are disclosed in U.S. Pat. No. 3,826,330 to Midolo et al. Improved cushioning is disclosed in U.S. Pat. No. 3,805,197 to Grignon et al. and U.S. Pat. No. 3,420,329 to Moore.

SUMMARY OF THE INVENTION

The present invention overcomes the problems of controlling air cushion vehicles by controlling the translation of the vehicle independently from control of the rotation (yaw). Lateral translation of the vehicle is controlled by diverting variably controllable flows of air from the flow of air used to create a propulsive thrust for forward translation of the vehicle to left and right lateral control ports. (As used herein "thrust" means the reaction force in any direction produced by the discharge of air.) The control ports are located approximately parallel to the fore-aft axis of the vehicle sufficiently proximate to a plane which passes through the yaw axis and is perpendicular to the fore-aft axis so that diverted air flows exiting the ports approximately perpendicular to the fore-aft axis create thrusts which predominantly pass through the yaw axis. (In the absence of external forces the yaw axis passes through the center of gravity of the vehicle.) The rotation or yaw of the vehicle is controlled by creating controlled moments with respect to the yaw axis with a directionally orientable thrust located at a different point from the lateral control ports, preferably as far as is practical from the yaw axis, usually near the stern. It is recognized that the yaw axis (and center of gravity) of the vehicle will change position according to the distribution of its load. In cases where the side ports do not lie in the plane which passes through the yaw axis and is perpendicular to the fore-aft axis, but are sufficiently proximate to it that the preponderant resultant thrust passes through the yaw axis, a thrust perpendicular to the fore-aft axis created by diverted air exiting a port will generate a moment with respect to the yaw axis in addition to controlling lateral translation. Even so the side thrust only controls the lateral translation because any undesired moment with respect to the yaw axis generated by air exiting a port can be counteracted by a greater moment generated by the primary yaw control. The capability to design any airborne vehicle which can accommodate changes in the position of the yaw axis with loading or other forces is a requisite ability of one skilled in the art of airborne vehicle design. Failure or inability to take this consideration into account in the design of an airborne vehicle may make the vehicle unstable and more difficult to control with any control system.

The method of the invention has the advantage of simplicity when compared with lateral control methods which rely on thrust applied on opposite corners fore and aft of the yaw axis and the advantage of greater control when compared with lateral translation control methods which rely on positioning the vehicle at an oblique angle to its direction of movement. When an air cushion vehicle is propelled by a directionally variable thrust, the direction of which does not pass through the vehicle's yaw axis, it creates a moment with respect to the yaw axis causing the vehicle to rotate about itself. In such a vehicle any thrust which passes through the yaw axis at an angle with respect to the direction of movement of the vehicle resolves into two components:

a) one component acting on the direction of movement and thereby controlling the speed of the vehicle, and b) the other, acting perpendicular to the direction of movement and thereby controlling the sideways translation of the vehicle, commonly referred to as the "centripetal force". The magnitude of each component for a given thrust depends on the angle of the thrust with respect to the direction of movement of the vehicle. Lateral control of such vehicles relies on the perpendicular component to counteract the centrifugal force. Consequently air cushion vehicles in which yaw is the only operable directional control must be positioned at an oblique angle to their direction of movement to control lateral translation.

According to the present invention the magnitude of each component may be selected and individually controlled by the operator, thus eliminating dependency on oblique course angles. Using the apparatus of the present invention it is now possible by simple selection to use total available propulsive thrust to create a centripetal force without the need to position the vehicle perpendicular to its direction of movement.

The apparatus of the invention also permits complete control of the vehicle when hovering or in motion. The air flow which is used to control the lateral and longitudinal translation hereinafter the "control air flow" is controlled by control air distribution means of the invention which will be described more completely beyond.

The control air flow is selectively diverted from the propulsive air flow by the air flow distribution system of the invention located in the downstream flow of a ducted fan used to propel the vehicle. The control air flow may be partially or completely diverted to one or both side ports by the control air distribution means. When the control air flow is diverted completely to one or both side ports, no propulsive thrust is generated, and the vehicle hovers. The operator, using the control air distribution means, variably selects the proper amounts of air to the right and left ports, controlling the lateral translation during hovering. The flow of air from the side ports may be further directed in different directions by thrust direction changing means such as the bellows-type or adjustable vane diverters described beyond. Since less propulsive thrust or even none is desired or even necessary when turning, hovering, slowing, stopping or reversing the vehicle, the use of air diverted from the air used to create propulsive thrust to effect such controls as lateral and longitudinal translation allows the use of a smaller overall power source for the vehicle.

In summary, the control system and vehicle of the present invention permits complete control of the vehicle on hovering and in movement turning the vehicle without the need to position it at an oblique angle to its direction of movement use of a smaller power source because the relationship between the centripetal forces and the propulsive forces means that both do not need to be generated at the same time, which allows the use of a common power source to generate both forces the operator to use the total available propulsive thrust to counteract the centrifugal forces without the need to position the vehicle perpendicular to its direction of movement.

In another embodiment of the invention the control air distribution system of the invention is used in a lightweight air cushion vehicle which utilizes components which can be easily assembled and disassembled. The design of the air cushion vehicle of the invention provides easily disassembled components which may be designed to collapse, fold or otherwise occupy minimal space when not in use or when being transported. Thus the vehicle may shipped from the manufacturer to the reseller without the need for expensive transportation, can be disassembled by the user for storage in a minimal area, and may be transported in small vehicles such as minivans, or even in the trunk of a passenger automobile. Special trailers are not necessary for transporting the air cushion vehicle. Steering or control of the vehicle is effected by the use of controllably variable air flow from the control air distribution system of the invention directed through ports located proximate to a plane which passes through the yaw axis and is perpendicular to the fore-aft axis. Further, the control air distribution system of the invention allows the propulsive air flow to be reversed to slow, stop or reverse the vehicle.

The lightweight air cushion vehicle of the invention comprises the control air flow distribution apparatus of the invention, an engine, an engine chassis, an engine-driven propeller or fan, means for directing the air flow from the propeller for use as control air flow and/or creating lift, an air inflatable annular tube, an enclosure for the annular tube, a seat which also serves as an air duct for the propulsive air flow directed by the control air flow distribution apparatus of the invention from the propeller or fan to create rearward thrust, and yaw control means such as an aerodynamic control surface such as a rudder or baffle system mounted in the propulsive air flow or means for controllably directing an air flow to create a thrust to the left or right near the rear of the vehicle. Preferably the vehicle is also provided with a skirt attached to the annular tube enclosure. The vehicle may also be provided with an air pump to inflate the various collapsible components of the vehicle such as the annular tube. The air pump may be independently powered, or preferably is operated by a take-off from the engine which powers the propeller or fan. The propeller or fan is driven by the engine and the engine and propeller are mounted in the engine chassis. The engine chassis has a plurality of openings, an inlet for air flow to the propeller, an outlet for air used for propulsion and control and an outlet for creating a lifting force. The means for directing the air flow from the propeller to create thrust and/or lift is mounted in the engine chassis more or less immediately behind the propeller or fan and is positioned to split the air flow to a rear opening for control of the vehicle and a bottom opening to create a lifting force. The annular enclosure has a plurality of peripherally positioned outlet openings in its lower surface and an opening to receive the engine chassis in its upper surface. The engine chassis is positioned over the opening in the upper surface of the enclosure. The seat is positioned downstream of the engine chassis, forms a duct for the rearward flow of propulsion air, and is secured to the enclosure. If a rudder or baffle system is used for yaw control it is mounted at the outlet end of the duct formed by the seat. Either or both the seat and the rudder or baffle system may be an inflatable structure or a rigid structure fabricated from a light-weight metal or plastic. An inflatable seat may be formed from a series of coaxial or longitudinal annular members connected to one another by a plurality of inflatable tubes to form a duct. The inflatable seat may be inflated prior to use by means of an off-vehicle pump, or if an onboard pump is used, it may be connected to the seat by suitable duct-work and controls to afford inflation. An inflatable rudder or baffle may be readily formed by placing a substantially flat frame forming the outline of the rudder within an inflatable enclosure of substantially the same outline. Alternatively, yaw control may be obtained by diverting a portion of the lift air, or a portion of the control air flow, to left and right outlets located at the stern of the vehicle and more or less perpendicular to the fore and aft axis of the vehicle.

The enclosure member has a recessed region which contains the engine and supports the engine chassis. Thus the engine is at least partly contained within the annular tube member, which serves to lower the center of gravity and increase the vehicle's stability. Preferably the engine is mounted as low as possible within the annular tube. When a vehicle is used over water, and power is lost or the vehicle is brought to rest on the water for some other reason, it will seek its buoyancy level, causing water to rise to some level above the lower surface of the tube. Although this may bring the engine below the water level, it can be protected if the bottom and walls of the recess are made of water-impenetrable material and the walls are high enough for the top of the recess to remain above the water.

The structure of the air cushion vehicle is such that when air is evacuated from the inflatable annular tube and any additional inflatable elements until they are collapsed, the air cushion vehicle is reduced in its physical dimensions. Since collapsible members occupy little space when collapsed, and few of the vehicle's components are rigid, if the seat is also inflatable the vehicle can be collapsed essentially to the size of the engine chassis. If the seat is not inflatable, the vehicle can be collapsed essentially to the size of the engine chassis plus the seat. Conventional attachment means such as straps, clamps, or the like may be used to attach the engine chassis to the enclosure, and, if desired, the seat to the engine chassis and/or the enclosure. The components then may be separated from the enclosure to form individual components to facilitate shipping and handling the vehicle when it is not in use.

DESCRIPTION OF THE DRAWINGS

The objects and advantages of the invention become apparent and the invention may be more clearly understood from the following specification, particularly when read in conjunction with the attached drawings wherein:

FIGS. 7A, 7B, 7C and 7D are schematic illustrations of four control air flow patterns produced by the control air flow distributor and thrust direction changing means of the present invention.

DESCRIPTION OF THE PREFERRED EMBODIMENTS

Figure 1:
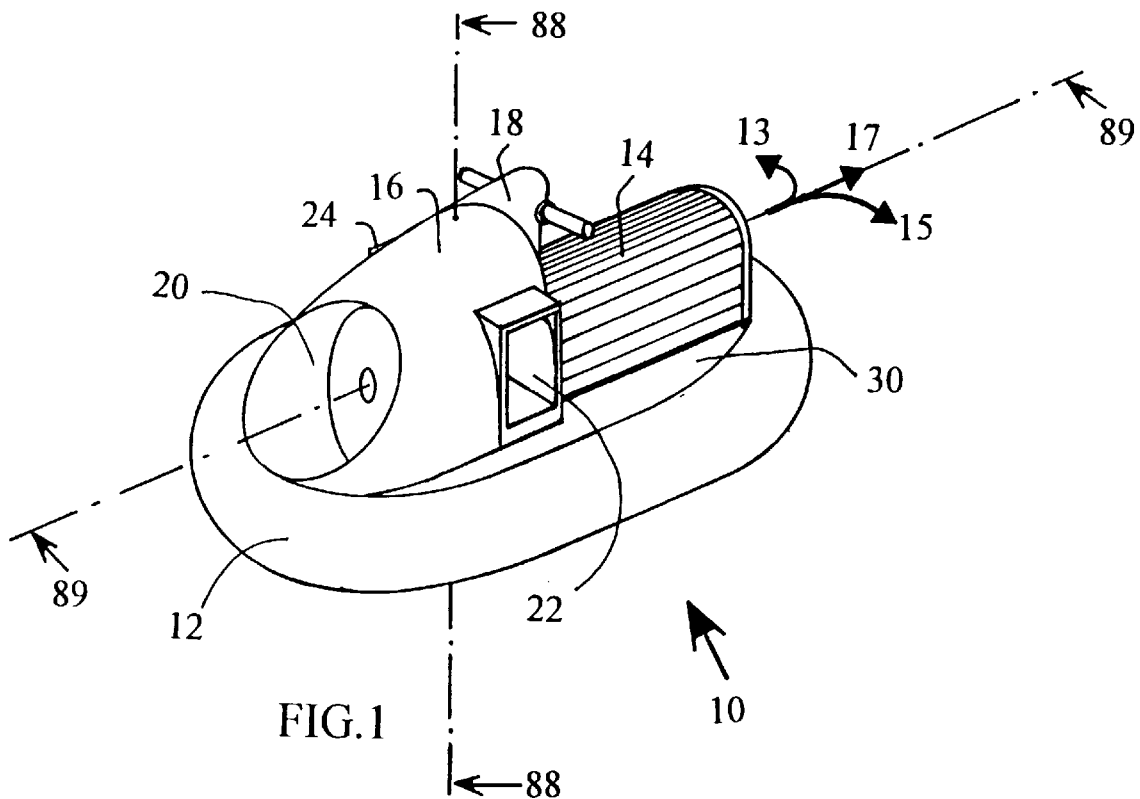
FIG. 1 is a perspective view of a portable air cushion vehicle which embodies the present invention.

The air cushion vehicle 10 as shown generally in FIG. 1 may be provided with conventional components. The design, location and functions of the components however are not necessarily in conformance with the teachings of the art. The use of novel components has been employed as necessary to produce new functions not previously used in air cushion vehicles. The embodiment illustrated in FIG. 1 is a front intake, rear propel design. This embodiment used to illustrate the principles of the present invention comprises but is not necessarily limited to:

an inflatable annular tube;

an envelope for the annular tube having a receptacle for an engine chassis, peripherally spaced outlets on its under side for lifting air, latches and or fasteners for locking the engine chassis and seat in place, and to which envelope a skirt optionally may be attached;

an engine chassis to which an engine is attached and which in turn is placed in the receptacle in the envelope for the inflatable annular tube and is attached thereto;

an engine shell or shroud which forms an intake duct and is also used for safety and cosmetic purposes attached to the chassis;

a propulsion system which comprises an engine or turbine and a propeller or fan;

an air flow splitter which divides the airflow created by the propulsion unit into two components, lift air flow and control air flow;

the control air flow directing means of the invention, which is used to apportion the control air flow between propulsion, steering, braking and stopping as set out in greater detail below;

an inflatable or light-weight plastic seat formed to create a duct when it is attached to the envelope and the propulsion outlet of the control air flow directing means;

a handle bar assembly; and inflatable air deflectors.

In a preferred embodiment of the present invention the control air distribution system includes air baffles and side deflectors. Suitable side deflectors and the rear deflector for example may be structurally similar and include U-shaped plates with inflatable air bags between the U-shaped plates, a cover fabric for the plates to form an enclosure, and a mechanism for returning the rear air deflector to its closed or uninflated position. Other thrust direction changing means such as adjustable guide vans may also be used. The steering and braking system is shown incorporated into the handle bar assembly, although other means such as foot pedals and/or hand-operated levers may be used. In the embodiment shown rotation of the handle bar actuates sliding valves and twisting of the handle actuates the rear thrust deflector. Preferably the controls are operated pneumatically. Suitable mechanical linkages also may be used for the controls. A pneumatic system may incorporate flexible tubes as conduits which do not interfere with collapsing of the vehicle. One or more air pumps may be powered by the engine or independently to provide pressurized air for actuating the control mechanisms.

Detailed Description of the Structural Components of the Invention

Figure 2:
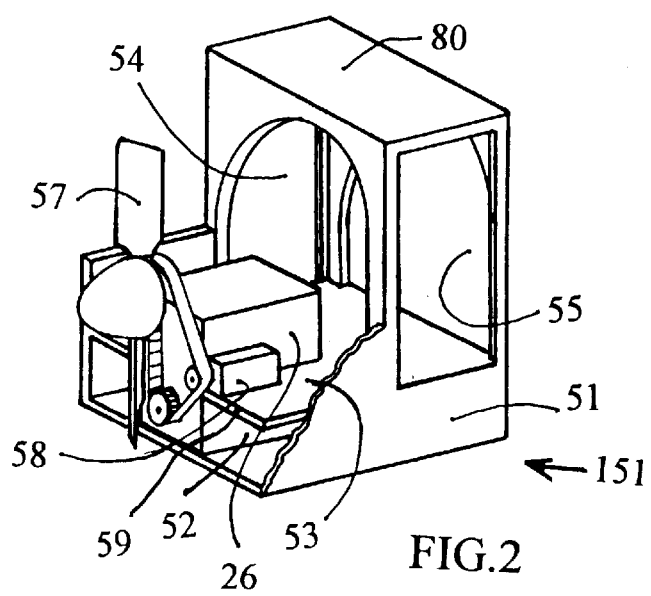
FIG. 2 is a perspective view, partly in section, of an engine assembly for the air cushion vehicle.
Figure 3:
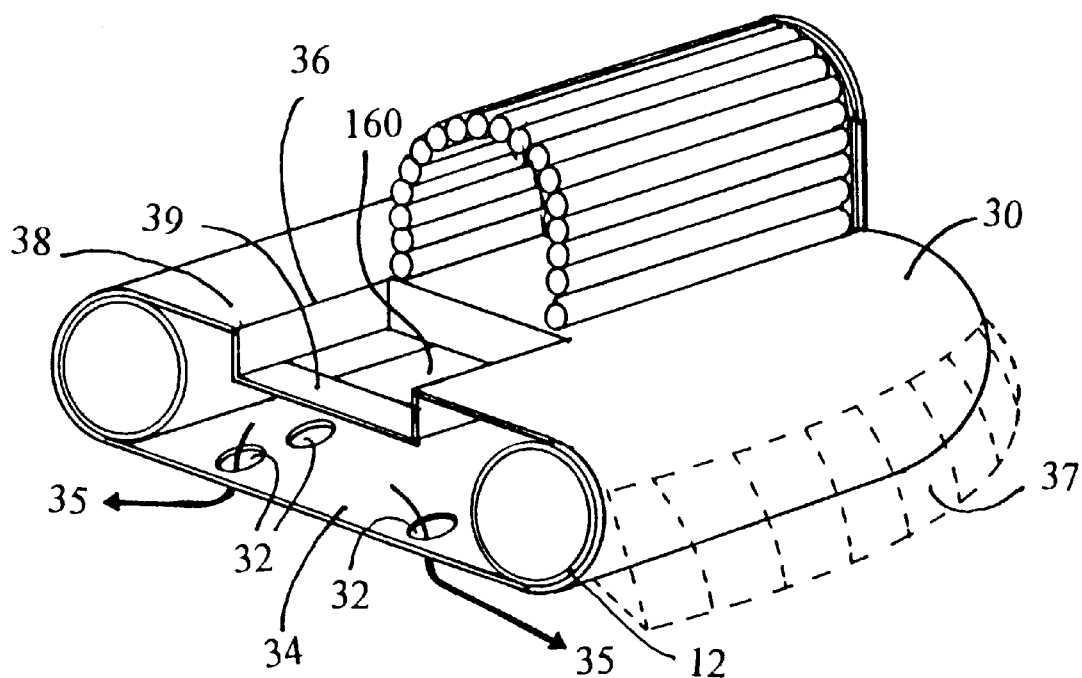
FIG. 3 is a perspective view, partly in ross-section, of the annular ring, its envelope, and the seat/duct of the air cushion vehicle showing typical flow of lift and thrust air.

The assembled and inflated air cushion vehicle 10 is illustrated in FIG. 1. Intake air enters the inlet 20 due to the action of the engine 26 which drives the propeller 57 as shown in FIG. 2. As shown in FIG. 2 the engine 26 is housed within the engine chassis generally indicated as 51. Returning to FIG. 1, part of the air brought in through inlet 20 is channeled through the seat assembly 14 as described in detail beyond. The steering assembly or handle bar 18 controls the side ports 22 and 24 which control translation of the vehicle and in accordance with the invention are placed proximate to a plane which passes through the yaw axis 88 and is perpendicular to the fore-aft axis 89 of the vehicle. A portion of the intake air is expelled under the annular tube 12 to lift and maintain the vehicle 10 above the surface. The annular tube 10 resembles a large automobile or truck inner tube, and is similarly inflated with air to provide an essentially rigid structure. The annular tube 12 is covered by an envelope 30. As shown in FIG. 3 the envelope 30 is provided with a plurality of air outlets 32 for lifting air in its lower surface 34 as is well-known in the art. The envelope 30 is also provided with an engine receptacle 36 in its upper surface 38. The engine receptacle is formed to receive the engine chassis 51 which is bolted or otherwise attached to the upper surface 38 as will be described beyond. The recessing of the engine 26 and engine chassis 51 within the envelope 30 provides a lower center of gravity which increases the stability of the vehicle 10. A skirt 37 chosen from among the designs well-known to the art, preferably a "finger type" skirt, or less desirably a plenum chamber skirt, may be attached to the envelope 30 around the periphery of the annular tube 12 as partially shown in dashed outline. Preferably the skirt 37 is removable so that the style of skirt may be varied to conform to the requirements of a particular application. For example, different skirt designs are preferred for use on grass, ice, and water. Generally no skirt is used when the vehicle is used on dry lawns such as golf courses.

Referring once again to FIG. 2 the engine 26 powers fan or propeller 57 and may also be used to power air pump 58, most conveniently using a common drive belt, chain or other drive means. The fan or propeller draws air in through the air intake 20 (FIG. 1) which is employed as lift air or control air, or a combination thereof. The incoming air is divided by the air splitter 59 to enter the upper 53 and lower 52 regions of the engine chassis 51. The vertical position of the air splitter 59 determines the distribution of air flow between lift air passing into area 52 and control air passing into area 53. Preferably the vertical position of the air splitter 59 is vertically adjustable to accommodate varying operating conditions. Thus, for example, if greater lift is required due to particular terrain conditions, a greater amount of air may be diverted for lift. Attached to or integral with the engine chassis is the shell of the control air distributor of the invention 80 which is described below. The combination of the chassis 51 and the control air distributor 80 is referred to hereinafter as power assembly 151.

Figure 4:
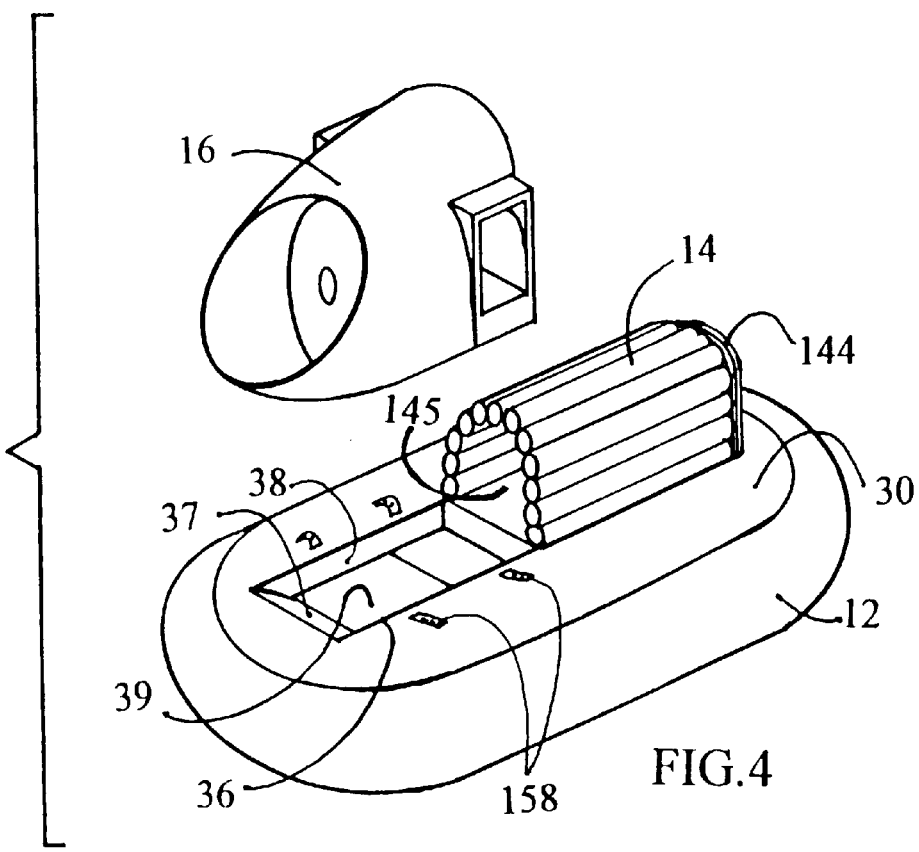
FIG. 4 is a perspective view of portions of the air cushion vehicle.
Figure 5:
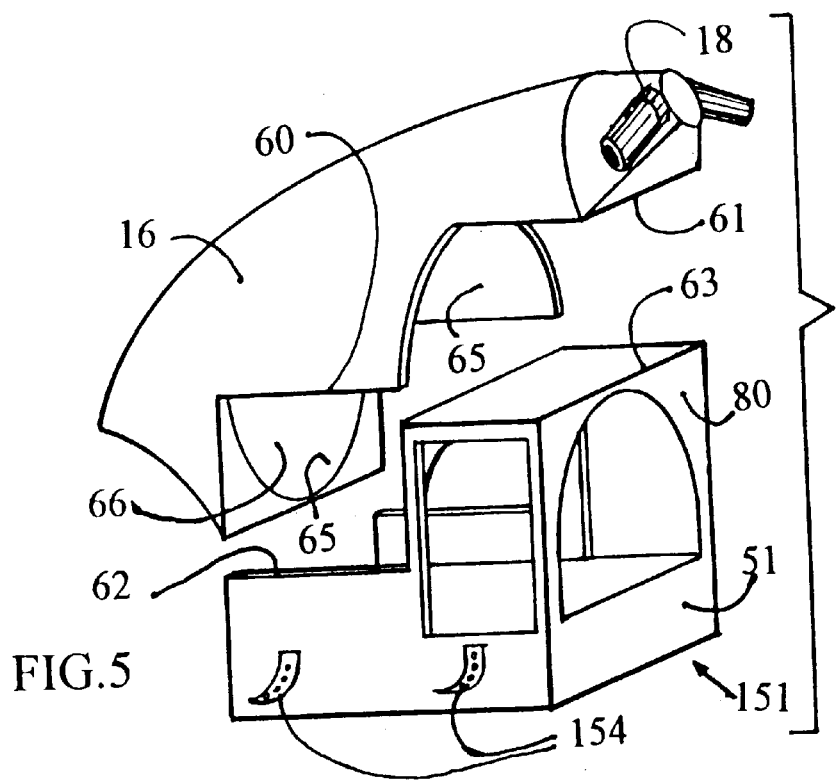
FIG. 5 is an exploded view of the power assembly and shell of the air cushion vehicle.

Referring to FIGS. 4 and 5 the power assembly 151 (hidden under engine shell 16 in FIG. 4) nests in the engine receptacle 37. The receptacle may be formed conveniently by attaching or forming pieces of a sturdy fabric or rubber sheet or other similar material to form a wall 38 with a flange 39 which is attached to the edges of the opening 36 in envelope 30. As shown in FIG. 5 the bottom edges 60 and 61 of the engine shell 16 attach to the edges 62 of the engine chassis 51 and the edges 63 of the control air distributor 80 respectively. Interactive latches or other attachment means 158 (FIG. 4) are provided adjacent to the opening 36 to secure the engine chassis 51. Interactive belts or other attachment means 154 (FIG. 5) are affixed to the power assembly 151 which interact with the attachment means 158 (FIG. 4) to secure the power assembly 151 to the envelope 30 of the vehicle 10. The attachment means 158 and 154 may be a standard belt/buckle combination, snaps, nuts and bolts or any other combination which serves to attach the power assembly 151 and envelope 30 securely to one another. If the envelope 30 is manufactured of fabric or rubber to allow for inflation and deflation it is not recommended that hard surface connectors such as metal be used in direct contact with the side supports. In such a case trunk latches or the like may be used, but they should be secured to the envelope 30 with a fabric or other non-abrading material.

Referring again to FIG. 3, the air flow which passes under the air splitter 59 into area 52 (see FIG. 2) is channeled through an opening 160 formed by the flange(s) 39 of the engine receptacle. The air flow thus channeled serves to provide lift for the vehicle by exiting as streams 35 through the air outlets 32 in the lower surface 34 of the envelope 30 as shown in FIG. 3.

Referring once again to FIG. 4 the basic air cushion vehicle 10 includes the seat/control air duct 14, a rear thrust directing means 144 (or alternatively a rudder mounted in the rear opening of duct 145), the envelope 30 plus the power assembly 151 which is placed in the engine receptacle 36. The seat/control air duct 14 serves as an "air tunnel" for control air diverted through the rear opening 55 of the control air distributor 80 shown in FIG. 2. The chamber 145 which is created when the seat 14 is attached to the envelope 30 is a duct which prevents air from dispersing non-directionally and keeps the air under sufficient pressure to cause it to flow through the rear thrust directing means 144 and propel the vehicle 10. Since the seat/control air duct 14 also serves as a seat, it must be constructed to support the weight of at least one person. This may be accomplished by fabricating it from light-weight rigid material(s) or inflatable soft materials. The embodiment of seat 14 shown in FIG. 4 is an inflated member formed of a plurality of interconnected tubular units. Preferably the tubular units are combined to form a single air chamber which is supplied with pressurized air by an air pump 58 which may be powered by the engine 26 (FIG. 2), a battery, or any other convenient means. Support of the weight of an average man requires an air pressure of about two (2) psi. The air pressure required to inflate and maintain pressure of the various inflatable components of the air cushion vehicle may be supplied by a single pump, or alternatively by separate pumps, as one to maintain the seat 14 in a turgid state and another for pressurizing the annular tube 12. Although it may appear critical to maintain the different inflatable components under different pressures, under most circumstances a single pressure or a relatively narrow pressure range can be selected which is adequate for all of the components. The seat 14 may be attached to the envelope 30 by any suitable attachment means such as the pile and hook fasteners sold as Velcro®, snap fasteners, or the like. When an inflatable seat 14 is used, the seat has no permanently rigid elements, and therefore it may be permanently attached to the envelope 30.

FIG. 5 shows an exploded view of the power assembly 151 with the engine shell 16. Air is brought in through the air intake 66 as previously stated. The inner surfaces 65 of the engine shell 16 form a duct around the fan 57 (not shown), and provide protection to the user from the fan as well as forming an air intake. The engine shell 16 is manufactured from a rigid material, preferably a light-weight material(s) such as aluminum, plastics or composites.

The control air distributor of the invention is preferably positioned within and as part of the power assembly 151 as shown in FIGS. 2 and 5 and is described in detail hereafter. Referring to FIG. 1 a steering means 18 is mounted on the engine shell 16. Although the mechanism is shown in FIGS. 1 and 5 as a handle bar, other means such as a steering wheel, joy stick, or the like may be used. The steering means 18 is connected to the control air distributor through a control means such as the system set out in detail below. Since many of the components of the air cushion vehicle are inflated, collapsible units, designed be separated from one another, it is most convenient, but not essential, that the steering mechanism be mounted on the engine shell 16 rather than elsewhere.

Figure 6A:
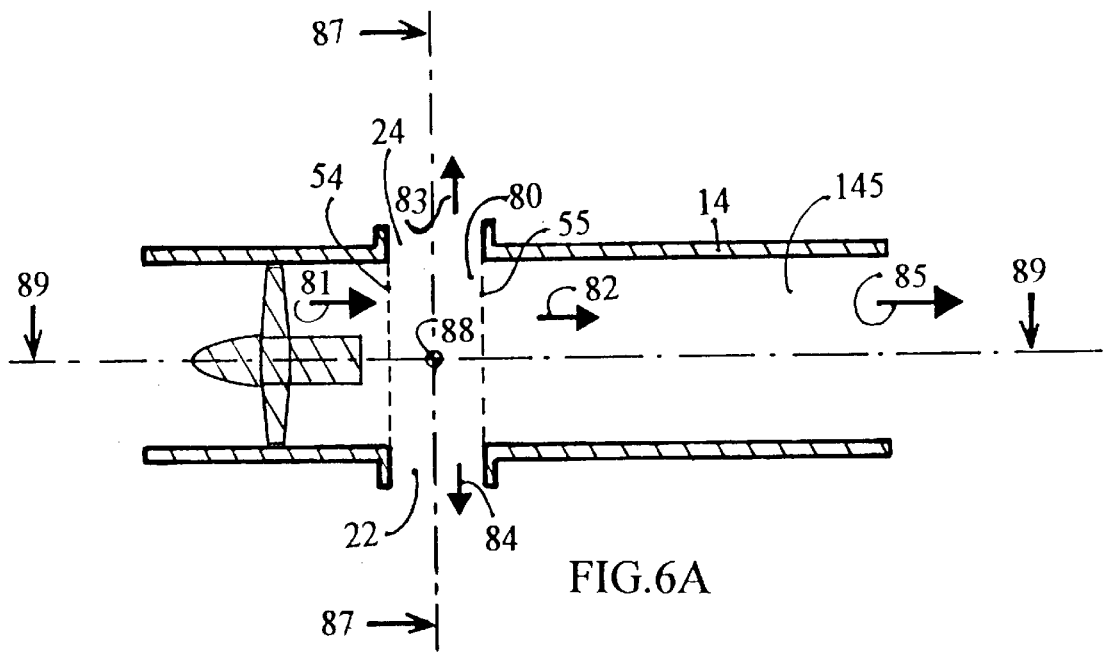
FIG. 6A is a top view schematic illustration of the distribution of air flows in accordance with the present invention.
Figure 6B:
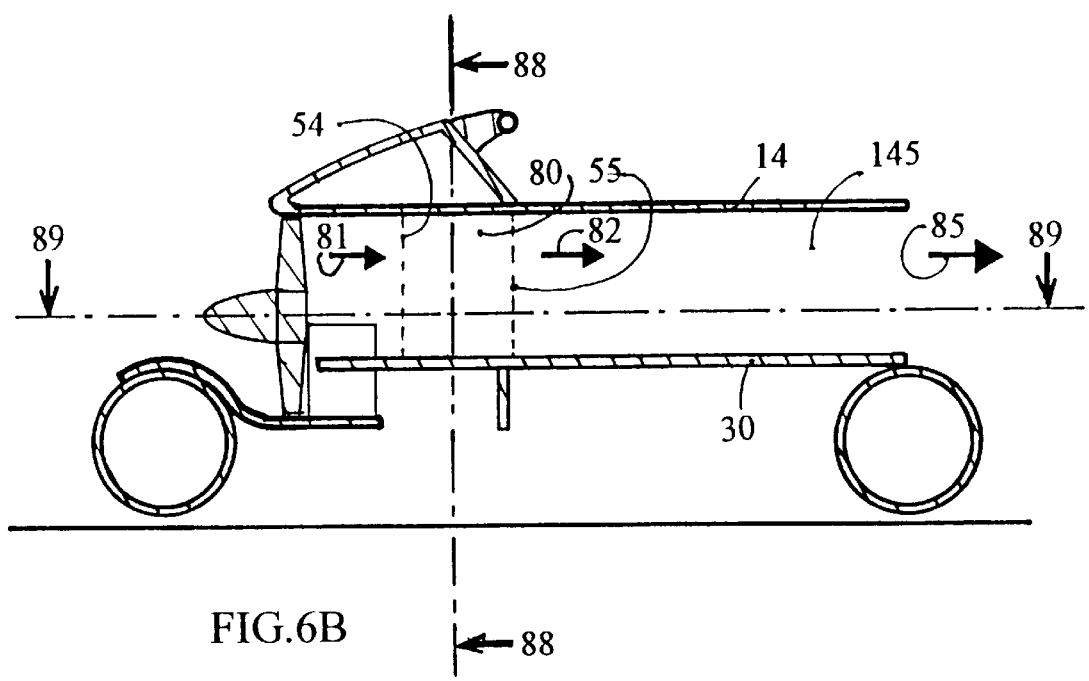
FIG. 6B is a side view schematic illustration of the distribution of air flows in accordance with the present invention.

As shown in FIGS. 6A and 6B the control air distributor of the invention 80 is placed in the upper air flow 81 from the air splitter 59 (FIG. 2) preferably within the power assembly 151. When the vehicle is traveling forward in a straight line the entire air stream 81 flows into inlet opening 54 in the front of the control air distributor 80, through the distributor and out of outlet opening 55 in the rear of the distributor (see FIG. 2) as stream 82 into the duct 145 formed by the seat 14 and envelope 30 to create the forward movement of the vehicle as it exits the rear of the duct as stream 85. To turn the vehicle a portion of the air stream 81 is diverted to form either right thrust air stream 83 or left thrust air stream 84 which exit right port 24 or left port 22 (also see FIG. 1) respectively to provide a side thrust at a point proximate to a plane 87 which passes through the yaw axis 88 and is perpendicular to the fore-aft axis 89 of the vehicle while at the same time the direction of the remaining air stream 85 is changed by the mechanism 144 (see FIG. 4) or other yaw controlling means such as a rudder or rudders mounted in or immediately adjacent the exiting airstream 85. All or a portion of air stream 81 may also be diverted in the control air distributor 80 into a forward air thrust to slow or stop the vehicle as will be discussed beyond.

The control air distributor of the invention includes flow diversion means. The embodiment shown in FIGS. 7A, 7B, 7C and 7D illustrates the use of movable baffles and adjustable guide vanes, but the principles illustrated may be accomplished using other diversion means. In the portion of the mechanism shown in FIG. 7A a baffle 92 is mounted in the distributor 80 so that its rearward end is fixed to the rearward edge of the side opening 94 (opening 22 of FIGS. 1 and 6A) of the side wall 93 of the distributor 80. The forward edge 96 of the baffle 92 is controlled by the steering means 18 (see FIG. 1) and is incrementally movable from a position against the side wall 93 (as in FIG. 7B) to a diametrically opposite position against the opposite side wall 95. In the central position shown in FIG. 7A half of the air stream 81 is diverted to flow as air stream 84 which exits at port 22 and the other half continues to flow to the rear as flow 82. At the extreme position against opposite side wall 95 all of air stream 81 is diverted to flow as stream 84 (not shown). In a like manner on the opposite side of the mechanism as shown in FIG. 7B a baffle 97 is mounted in the distributor 80 so that its rearward end is fixed to the rearward edge of the side opening 98 (opening 24 of FIGS. 1 and 6A) of the side wall 95 of the distributor 80. The forward edge 99 of the baffle 97 is controlled by the steering means 18 (see FIG. 1) and is incrementally movable from a position against the side wall 95 as shown in FIG. 7A to a diametrically opposite position against the opposite side wall 93. In the central position shown in FIG. 7B half of the air stream 81 is diverted to flow as air stream 83 which exits at port 24 and the other half continues to flow to the rear as flow 82. At the extreme position all of air stream 81 is diverted to flow as stream 83 (not shown). Thus the steering mechanism may be used to provide varying degrees of left or right translational thrust.

When both baffles are moved to meet one another as shown in FIG. 7C part of the inlet air 81 is diverted as stream 84 to outlet 94 and the rest as stream 83 to outlet 98. When the diverters or thrust direction changing means 210 and 211 also are activated the side thrusts 83 and 84 become reverse thrusts which slow, stop, or reverse the vehicle. Other thrust direction changing means (diverters) such as adjustable guide vanes may also be used.

Figure 19:
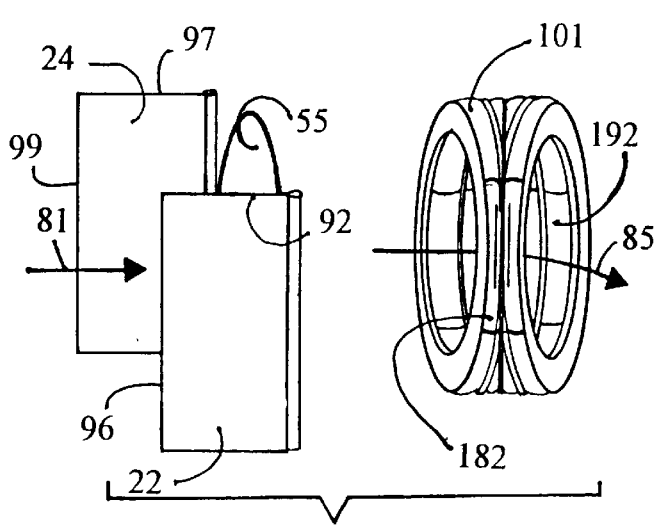
FIG. 19 illustrates a means of yaw control useful in the practice of the invention.

Referring now to FIG. 19 the baffles 92 and 97 normally close the side air ports 22 and 24, allowing the control air to flow through the rear opening 55 of the control air distributor. The pressure of air stream 81 forces baffles 92 and 97 against the ports, and grills (not shown) may be used over the ports 22 and 24 to keep baffles from bulging or blowing out through the ports.

Figure 16:
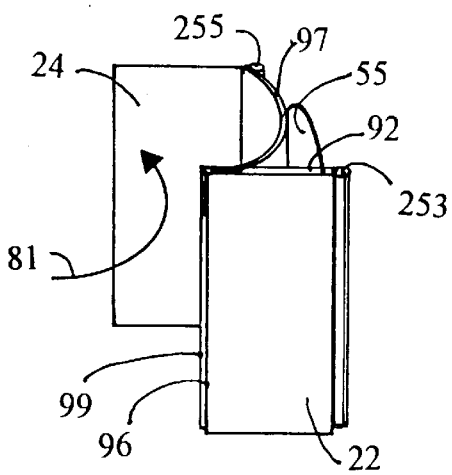
FIG. 16 is a schematic illustration of a baffle system useful for the operation of the air control distribution system of the invention which shows one side outlet port closed and the control air flow diverted to the other (open) side outlet port.
Figure 17:
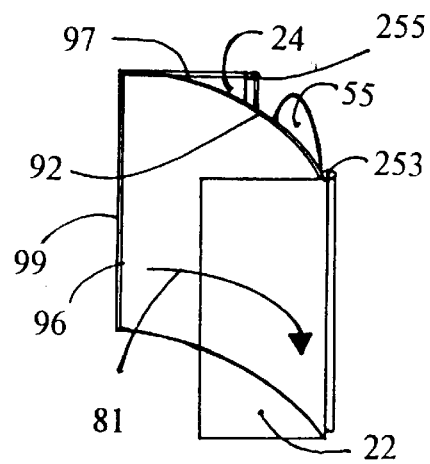
FIG. 17 is a schematic illustration of the assembly of FIG. 16 in which the opposite side outlet port is closed.
Figure 18:
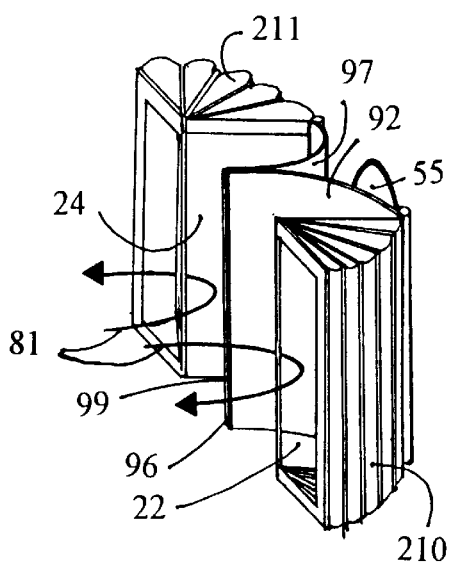
FIG. 18 is a schematic illustration of the assembly of FIG. 16 in which both side outlet ports are open and side deflectors are fully opened to produce reverse thrust.

As discussed above with regard to FIGS. 7A, 7B, 7C and 7D and also now shown in FIGS. 16, 17, and 18, the baffles 92 and 97 can be extended and their free ends 96 and 99 moved toward the opposite air port, thus diverting some or all of the control air flow 81 according to the position of the baffle(s). The baffles thus divert control air flow from propulsive thrust through opening 55 to side thrust through openings 22 and/or 24. The extendibility of the baffles may be obtained by using a window shade type spring-loaded coiled configuration. As shown in FIGS. 16 and 17 the baffles 92 and 97 are coiled around spring-loaded rods 255 and 253, as is well-known in the window shade art. In FIG. 16 as the baffle 97 is drawn toward the opposite air port 22, it is unrolled from its spring-loaded rod and port 24 is opened. In FIG. 17 as the baffle 92 is drawn toward opposite port 24, it is unrolled and port 22 is opened. In this manner each baffle can change its effective length and thereby extend from its spring-loaded rod to either close the adjacent air port or the opposite port. The spring loading of the rod is required to provide a force to return the baffle to its retracted state. Unlike a window shade, no mechanism is provided for locking the baffle in a fully or partially open position.

In addition to providing directional control, the control air distributor 80 is designed to provide braking action. A reverse thrust from either air port 22 or air port 24 or both may be achieved in a variety of manners. In the embodiment shown in FIG. 18 diversion of the side thrusts to create reverse thrust is accomplished by opening bellows-like diverters 210 and 211. As shown in FIG. 7D adjustable guide vanes 100 may be used as diverters by changing their angle with respect to the air flow 81 in the distributor 80 to change the direction of the exiting air stream(s) 83 and/or 84.

A preferred mechanisms for creating reverse thrust is air operated. Pneumatic mechanisms can be light weight and can be fabricated with few if any rigid components. In the embodiment shown as 101 in FIGS. 8 and 9 a plurality of circular or oval discs 102 is employed. The discs are separated by air chambers 103 which inflate when pressurized with air through opening 105 and separate the discs and open the air baffle 104. The unit 101 is spring biased to the closed position, and when air pressure in the chambers 103 is released, the baffle 104 returns to the closed position. When it is in the open position baffle 104 causes the air stream 108 to reverse its direction of flow and the reverse thrust of air stream 110 causes a slowing or braking action of the vehicle.

Figure 9:
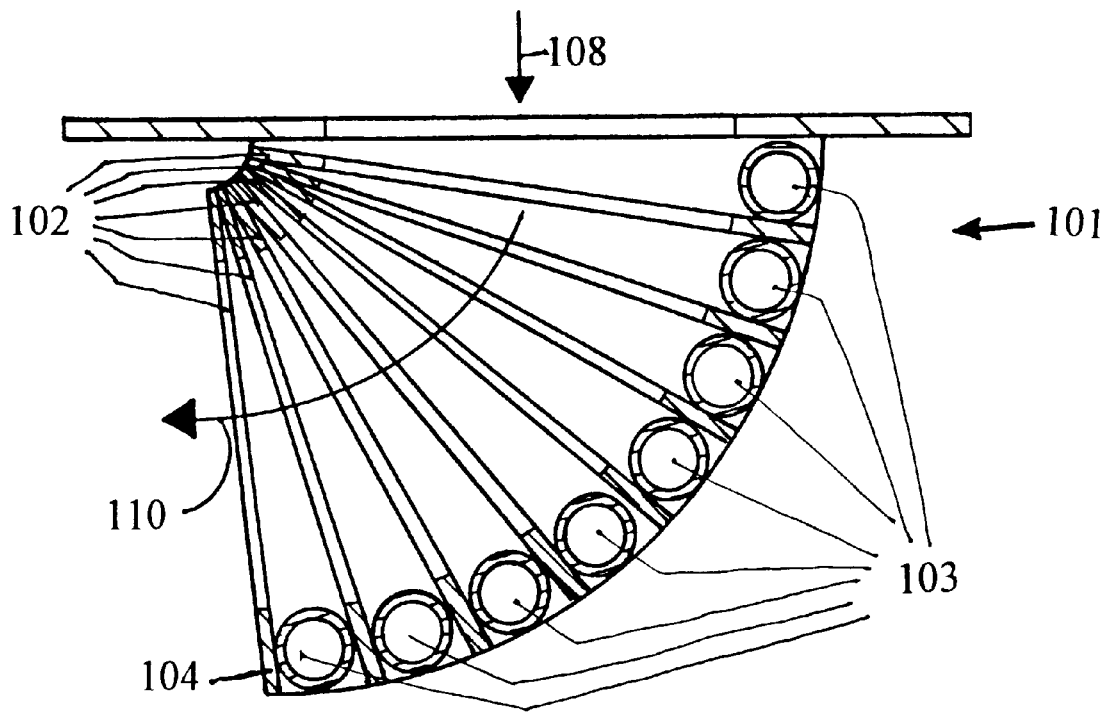
FIG. 9 is a top cross-sectional view of the annular baffle.
Figure 10A:
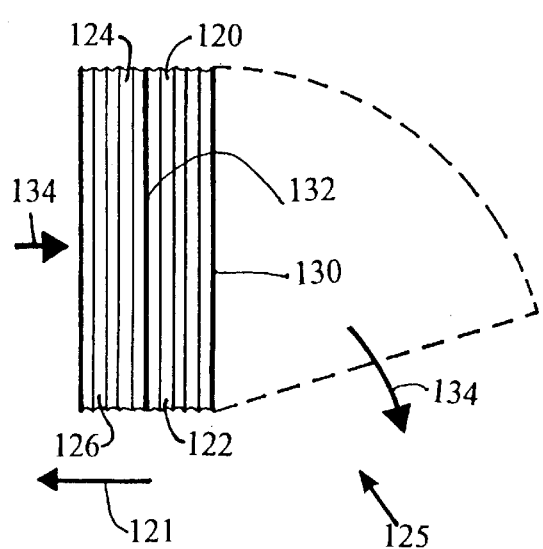
FIGS. 10A and 10B are top views of annular baffles useful for yaw control which show various operating positions.
Figure 10B:
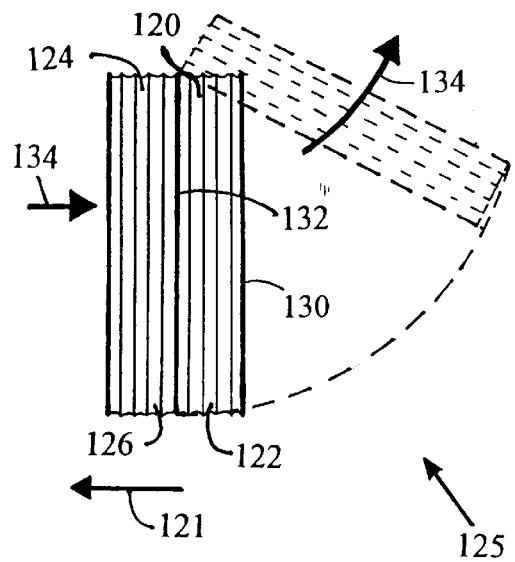
Figure 21C:
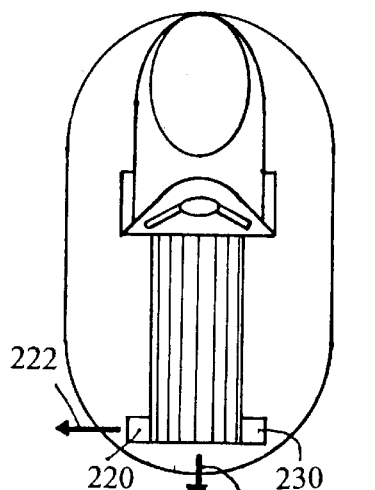
FIGS. 21A, 21B and 21C illustrate placement of various yaw control means and schematically show their operation.
Figure 21B:
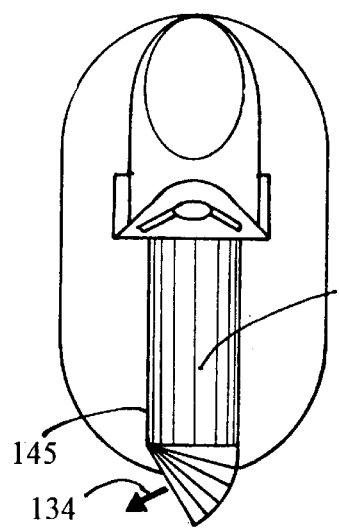
Figure 21A:
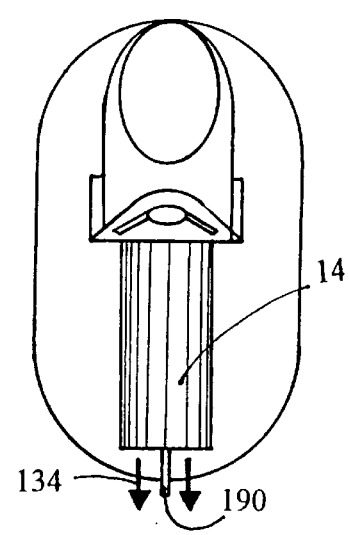

Yaw control means such as a rudder or equivalent means is needed for control of the vehicle. The rudder action shown in FIG. 1 selectively directs the propulsive thrust from the full drive direction 17 to a right turn flow 13 or left turn flow 15 and may be accomplished with one or more conventional blade-style rudders 190 mounted in the airstream exiting the rear of the seat/duct 14 as shown in FIG. 21A, or immediately adjacent thereto. To minimize its disassembled volume the rudder may be air-inflatable fabric stretched over a frame, or, since it is relatively thin (flat), it may be fabricated from a light-weight metal or plastic. In another embodiment a mechanism similar to that shown for thrust reversal in FIGS. 8 and 9 for thrust may be used. In this case the system is preferably an in-line assembly 125 partially shown in FIGS. 10A and 10B which is mounted at the rear outlet of the duct formed by seat 14 as shown in FIG. 21B) and, unlike the side air flow deflector system which employs separate units for creating left and right thrust, positions deflectors 130 and 132 in series. The deflector 130 may be formed in the same manner as 101 shown in FIG. 8, introducing air into outlet 105. Deflector 130 is the mirror image of 101. When the vehicle is traveling in a straight line in direction of travel 121 the deflectors 130 and 132 are in the resting position shown by the solid outlines in FIG. 10A, the air flow 134 is opposite to the direction of travel and therefore the vehicle's yaw is unaffected. Activating controller 130 causes controller 130 to swing open to the left of the direction of travel 121 as shown by the dotted outline in FIG. 10A causing the air flow 134 to be diverted to the left of the vehicle's direction of travel as shown by the dashed path in FIG. 10A and in FIG. 21B and therefore causing the vehicle to yaw to the right. Conversely, as shown in FIG. 10B, activating controller 132 causes it to swing open to the right of the direction of travel 121 as shown by the dotted outline (carrying inactive controller 130 along with it) causing the air flow 134 to be diverted to the right of the direction of travel as shown by the dashed path and therefore causing the vehicle to yaw to the left. The inflatable tubes 120, 122, 124 and 126 serve the same function as and may be similar to those shown as 102 in FIG. 8.

Figure 12:
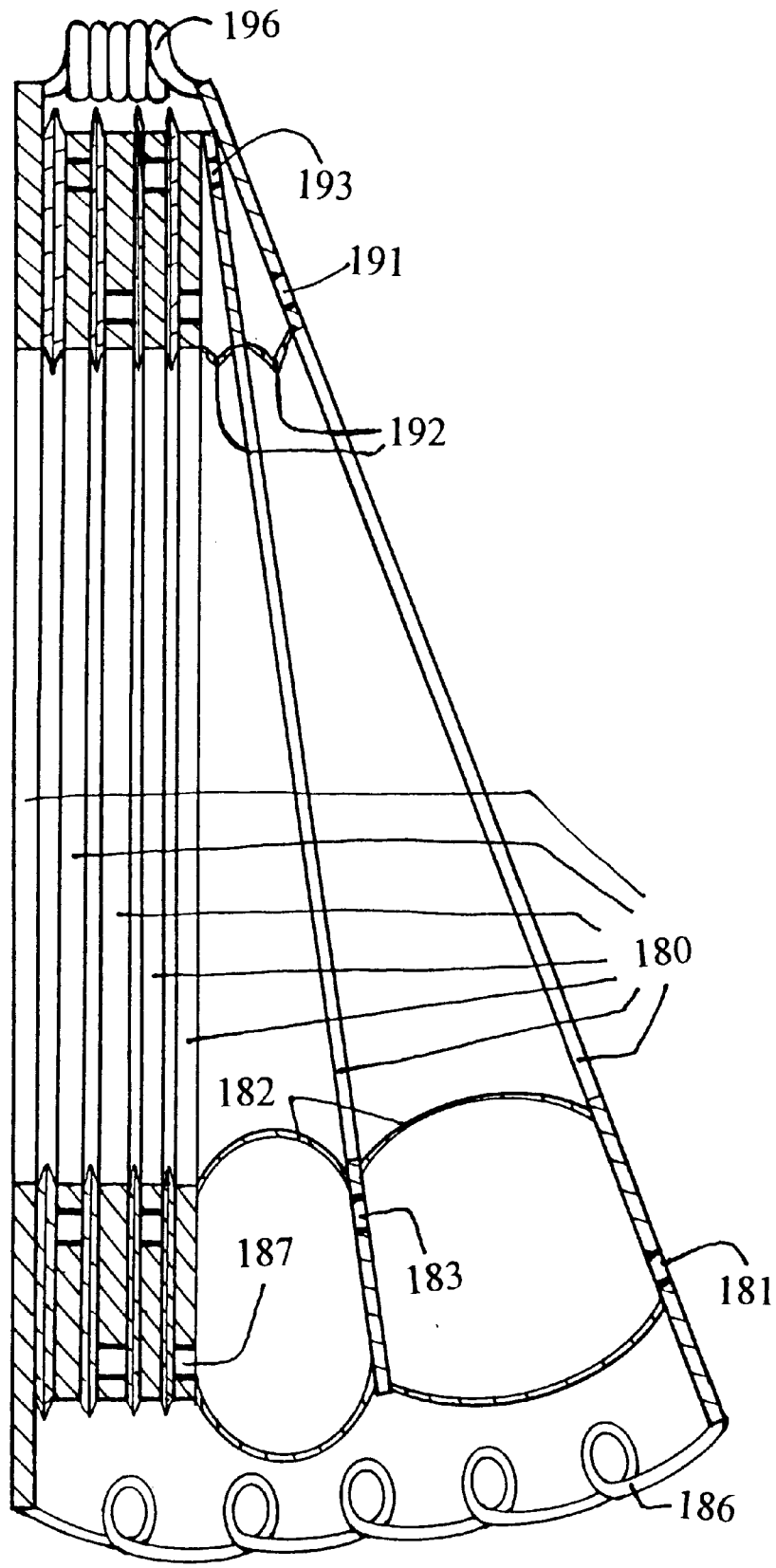
FIG. 12 is a top view of the baffle of FIG. 8.

In another embodiment shown in FIG. 12 the yaw control means or rudder may consist of a plurality of annular rings 180. This is mounted at the outlet of the duct 145 formed by the seat 14 as shown in FIG. 21B. Each pair of adjacent annular rings is separated by inflatable tubes 182 and 192. When the rudder is activated to create right yaw pressurized air enters the first tube 182 in the series of tubes through aperture 181. The series of rings 180 is held together by spring members 186 (and 196) and the pressurized air acts against the force of the respective springs. When creating a yaw force to the right the tube 182 fills to the point that its expansive force is greater than the resistive force of the spring 186 a third annular ring (which was sealing the passage 183) is moved away from its position, allowing air to inflate the second tube 182 whereupon the third annular seal 187, between the third and fourth annular rings 180 is moved away from the fourth annular ring 180. In order to for the tubes to fill one at a time the successive openings 183 in tubes 182 (and 193 in tubes 192) should be laterally displaced from each other. Thus causes each annular tube to open in turn in a stepwise manner. It should be noted that while reference is made to the use of air, any suitable fluid may be used in the system.

Applying air under pressure to the series of tubes on the left side of the rudder assembly as shown in FIG. 12 causes the left side of the assembly to expand, directing the air flow to the right causing the vehicle to yaw to the left. Conversely, applying air pressure to the right-hand series of tubes 192 through aperture 191 to create a yaw force to the left produces the opposite effect and causes the vehicle to yaw to the right.

Figure 20A:
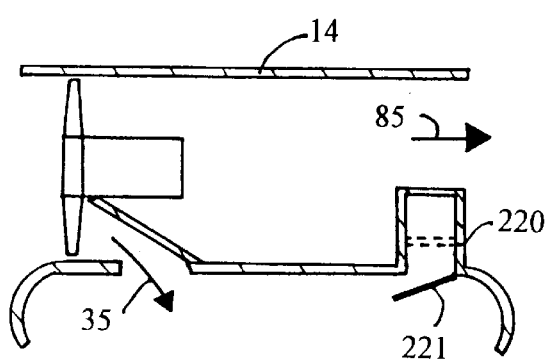
FIGS. 20A and 20B illustrate another means of yaw control useful in the practice of the invention.
Figure 20B:
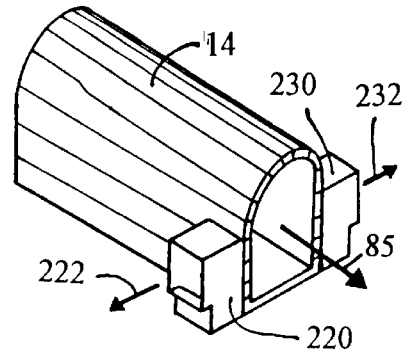

Another suitable yaw control means is shown in FIGS. 20A and 20B. Opening shutter or baffle 221 at the bottom of rear left thrust controller 220 allows a portion of the lift air 35 to enter the thrust controller and exit as left thrust stream 222 causing the vehicle to yaw to the right. Activation of shutter 220 may be accomplished by means of a foot-operated cable or pneumatic device or other means. Similarly activation of a corresponding shutter or baffle (not shown) at the bottom of rear right thrust controller 230 creates a corresponding right thrust stream 232 causing the vehicle to yaw to the left. Alternatively control air flow may be selectively diverted to the rear thrust controllers 220 and 230. Suitable placement of the thrust controllers are shown in FIG. 21C.

Figure 11:
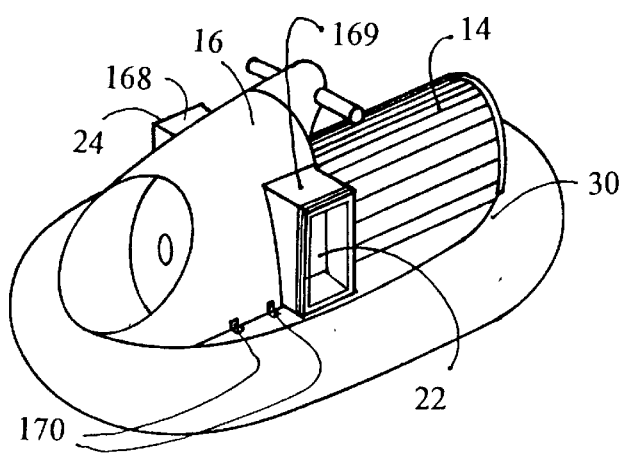
FIG. 11 illustrates placement of side thrust outlets for control air according to the invention.

As shown in FIG. 11, the housings 168 and 169 of side thrust outlets 22 and 24 may project beyond the sides of the engine shell 16 to afford protection to the operator sitting on seat 14 from the side thrusts. The side thrust housings 168 and 169 house the side and reverse thrust units. The engine shell 16 may be removably mounted on the envelope 30 using the aforementioned attachment means 170.

Figure 13:
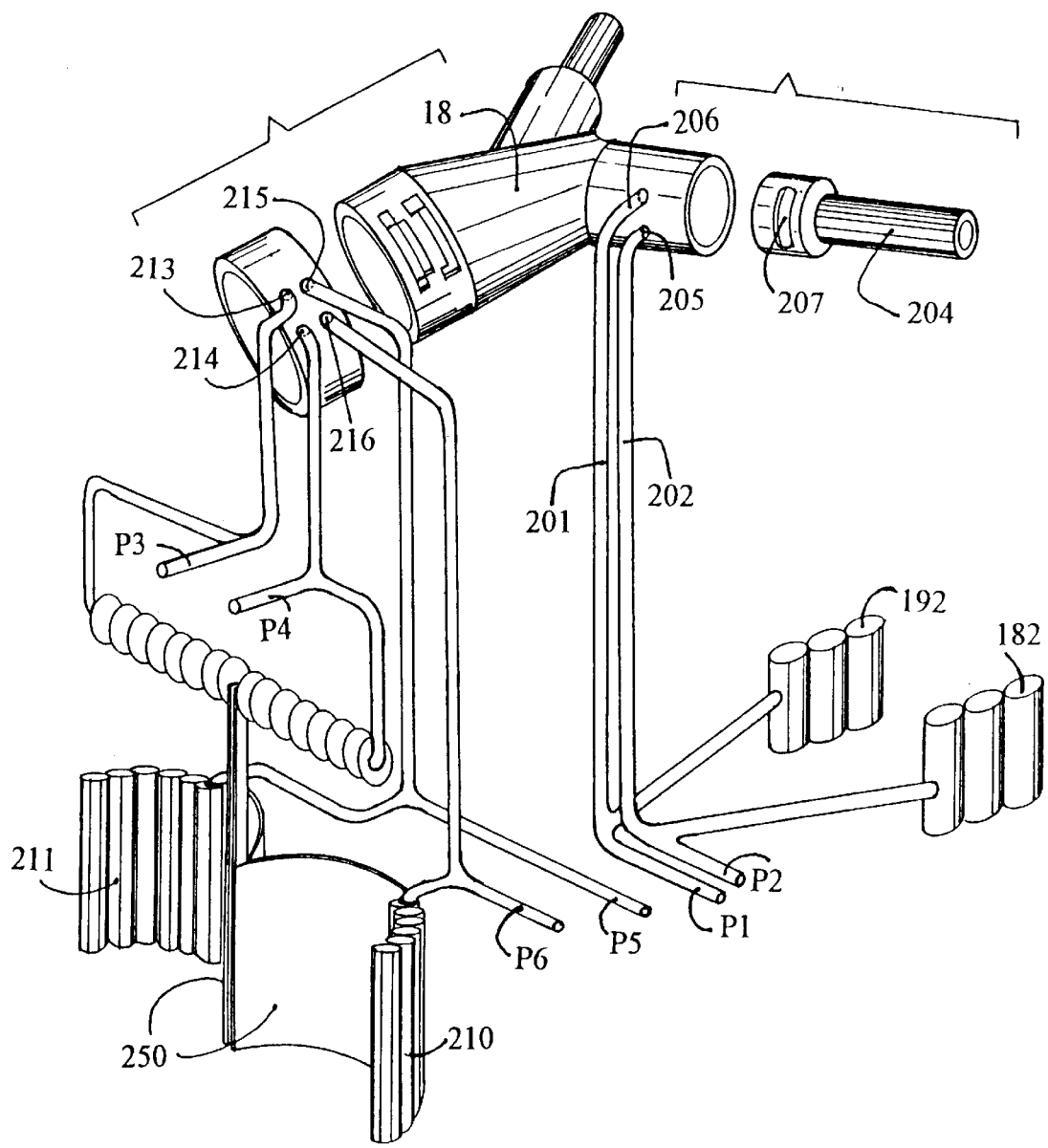
FIG. 13 is a schematic, partially exploded illustration of a control system useful in the practice of the invention.

As shown in FIG. 13 braking, stopping, or reversing of the vehicle may be achieved by use of the reverse thrust mechanism of the control air distributor 80 of the invention. The control air distributor 80 serves to:

1. direct all of the control air flow to provide a propulsive force,
2. direct some or all of the control air flow to either or both of the side thrusters and to control the amount flowing to each,
3. direct some or all of the control air flow to the sides for reverse thrust.

Figure 14:
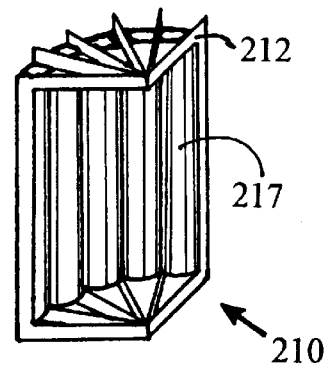
FIG. 14 is a perspective view of an air flow diverter useful as a thrust direction changing means of the invention.

One possible embodiment of the reverse thrust assembly of the control air distributor is shown for illustrative purposes in FIG. 14. FIG. 14 and the following description are of a left-side diverter for thrust opening 22 (see FIG. 1). The right-hand diverter for thrust opening 24 would be a mirror image of FIG. 14. A bellows-like assembly 210 is formed using U-shaped separators 212 which correspond functionally to the annular rings 104 of the rudder assembly illustrated in FIG. 12. In both assemblies an outer fabric covering is employed inside or around the annular rings 180 and inside or over the U-shaped separators 212 to complete the assemblies by forming tubes 217 to provide the air passages required for operation. The fabric may be an elastic material such as rubber or a relatively non-stretching cloth fabric. Assembly 210 may be fully opened as shown in FIG. 14, completely closed, or open to any degree in between. As in the case of the rudder assembly, step-wise sequential opening of the tubes 217 in the fashion illustrated in FIG. 12 may be employed to provide greater control of the diverter 210.

Control of the control air flow distributor may be provided by pressurized air or pressurized fluid (hydraulically). The embodiment illustrated in FIG. 13 utilizes air, which may be provided by the pump 58 (FIG. 2), but no limitation is intended thereby. It is convenient to operate the system using a steering mechanism as shown in FIG. 13. For yaw control, pressurized air in lines P1 and P2 is provided to the lines 201 and 202 and it is permitted to vent continuously through the air bleed outlet 207. Under these conditions a spring biased rudder such as that illustrated in FIG. 12 controlled by tubes and 182 and 192 is in the collapsed or closed configuration and the air flow flows straight out from the rear of the seat 14 (see FIG. 1) without deflection as stream 17. When the handle 204 is turned clockwise or counterclockwise the air bleed from either line 201 or line 202 is shut off by moving the air bleed outlet 207 out of alignment with one of the openings 205 or 206. The degree to which the alignment is offset varies the pressure in line 201 or 202 as the case may be, and thus controls the degree to which the rudder is opened by tubes 192 for right yaw control or tubes 182 for left yaw control.

A conventional lever controlled cable brake system or equivalents such as a foot pedal or the like may be used to actuate the thrust reversal mechanism of the vehicle. In another embodiment, a pneumatic system operated by relative movement of the handle bar 18 over a sleeve 229 as is set forth in FIG. 13 and FIG. 15 may also be used. As shown by dashed lines in FIG. 13, a sleeve 229 having openings of air lines 213–216 is fitted into in a sleeved portion 228 of the handle bar 18 having slots or openings 224 and 226 placed in a relationship to the openings of the air lines 213–216 such that they may be moved to the various positions with respect to the openings of the airlines 213–216 shown in FIG. 15 by relative movements of the sleeves 228 and 229 in directions 220 and 222 (FIG. 13). When the handle bar 18 is positioned so that the relationship of the slots 224 and 226 to the air passages 213–216 is as in sequence I (FIG. 15) each of the air lines is in the open or vented position. When the sleeves 228 and 229 are aligned in the position of sequence II, the four air lines 213–216 are fully closed, causing the air from lines P3, P4, P5 and P6 (FIG. 13) to activate the air flow diverters (shown as the tubes 210 and 211) to their fully opened positions, and the movable baffle 250 to direct all control air flow to the side outlets. Partial activation positions the openings to passages 213–216 in any intermediate position between that of sequence I and sequence II. Sequence III (FIG. 15) illustrates braking action in combination with partial activation of steering obtained by positioning sleeves 228 and 229. Partial closing of ports 215 and 213 causes the left port to be less than fully open and results in more air being directed to one side opening or the other. In sequences II, III and IV of FIG. 15 no control air flow is directed to the rear as propulsion thrust. In sequence V a portion of the control air flow is directed to one side outlet to produce a side thrust while the remaining control air flow provides propulsion thrust. In sequence VI all of the control air flow is directed to one side port producing the maximum side thrust.

Figure 15:
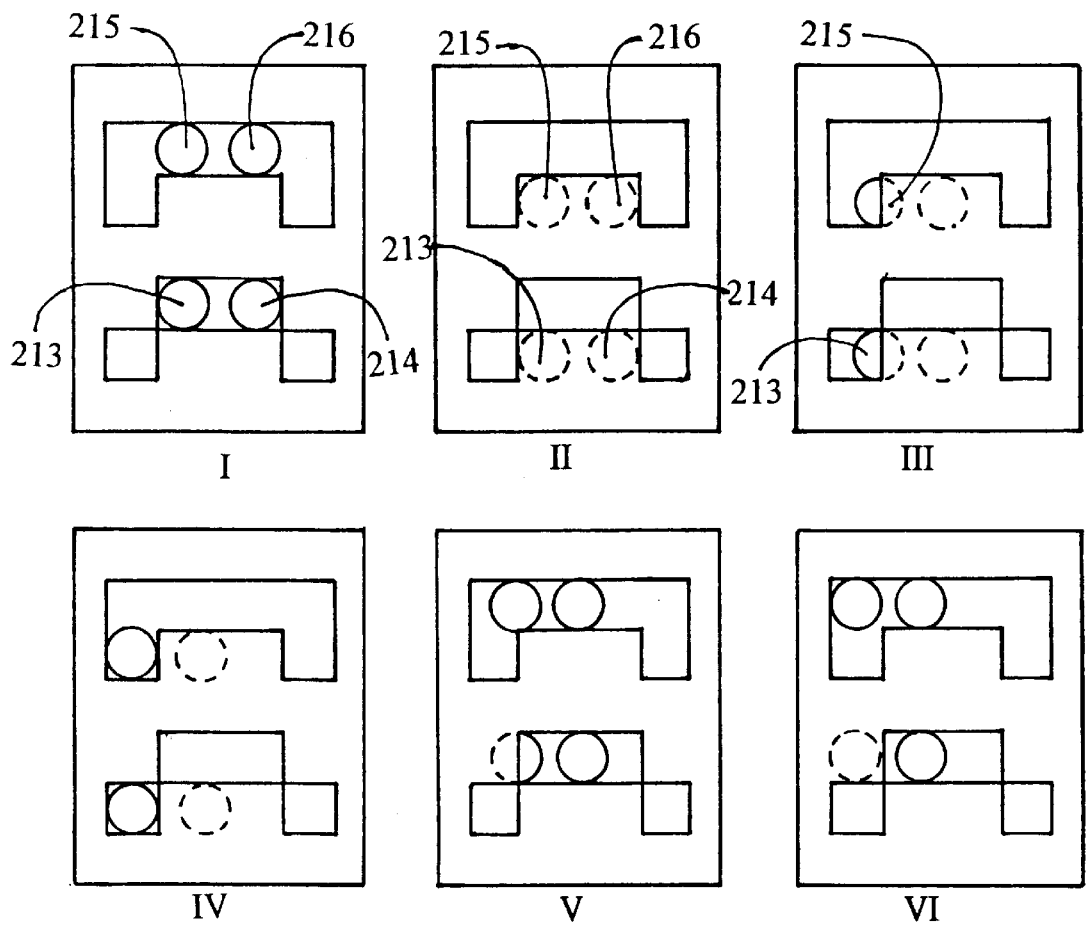
FIG. 15 is a schematic illustration of various positions of a sliding valve system useful for the operation of the air control distribution system of the invention.

In FIG. 15 sequence VI corresponds to the control air flow deflection shown in FIG. 16. FIG. 17 illustrates the reversal of the control air flow shown in FIG. 16. FIG. 18 illustrates the control air flow of sequence II in FIG. 15 which diverts the entire flow to reverse thrust. Referring to FIG. 16, the side opening 22, is closed by the deflector 92. In FIG. 17 the deflector 92 is shown extending fully across the path of the control air flow which diverts all of the control air flow to side thrust. Referring to FIG. 18, the deflectors 92 and 97 are shown each half way across the control air flow path, thus diverting half of the control air flow to left thrust and half to right thrust. In FIG. 18, which corresponds to sequence II of FIG. 15, the thrust reversal assemblies 210 and 211 are shown in the full open position which reverses the control air flow to produce maximum reverse thrust.

Figure 8:
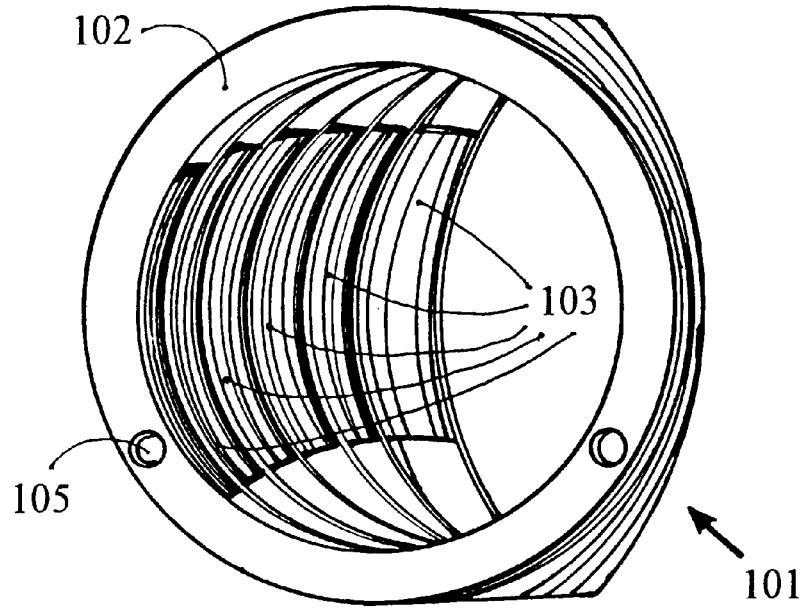
FIG. 8 is a perspective view of an annular baffle useful in directing control air in the air cushion vehicle.

FIG. 19 illustrates the operation of yaw control when an embodiment using a rear thrust direction system 101 described in FIGS. 8 and 12 is used as a rudder. When the inflatable tubes 182 or 192 on one side of the rudder are expanded the propulsive thrust air is deflected to one side, which produces a yaw effect.

Description of Operation of a Portable Air Cushion Vehicle Which Employs the Invention The portable air cushion vehicle of the invention is normally stored in a completely collapsed form with the annular tube essentially completely deflated and the seat/air duct (if it is inflatable) as well. The engine chassis and the components housed within it may be separated from the collapsed component(s). When reassembling the vehicle the engine chassis is reattached to the envelope member and pressurized air is used to inflate the annular tube and, if necessary the seat/air duct.

The propeller draws air through the front duct and during normal forward movement the portion of the air flow described herein as control air flow is expelled from the rear as propulsion air and the remainder from the bottom of the envelope as lift air. The splitting of inlet air into lift and control air flow is achieved by use of an air splitter mounted in the engine chassis. The splitter divides the air flow from the propeller into the desired ratio of lift air to control air. The control air distributor of the invention is conveniently controlled by the steering mechanism to provide the desired combination of propulsion thrust, side thrust and thrust reversal. During maximum thrust reversal the baffles in the control air distributor divert all air flow from the seat/air duct to the side outlet ports. The deflectors in their extended position direct the control air flow to produce reverse thrust. Directional control or steering of the vehicle is achieved by manipulation of thrust direction(s) by means of the control air distributor of the invention in combination with a rudder or its equivalent.

I claim:

1. An air cushion vehicle propelled by a propulsive air flow which is separate from the air flow used to create an air cushion, having a bow, a stern, a left side having a port, a right side having a port, a fore-aft axis, a yaw axis and air distribution means operable to divert variably controllable flows of air from the propulsive air flow independently to each of the ports, said ports being located approximately parallel to the fore-aft axis sufficiently proximate to a plane which passes through the yaw axis and is perpendicular to the fore-aft axis so that diverted air flows exiting the ports approximately perpendicular to the fore-aft axis create thrusts which predominantly pass through the yaw axis.

2. The vehicle of claim 1 wherein each port is provided with a thrust direction changing means which is operable to variably change the direction of diverted air flow exiting the port from approximately perpendicular to the fore-aft axis to approximately parallel to the fore-aft axis.

3. The vehicle of claim 1 wherein each port is provided with a thrust direction changing means which is operable to variably change the direction of diverted air flow exiting the port from approximately perpendicular to the fore-aft axis to a forward direction approximately parallel to the fore-aft axis.

4. The vehicle of claim 1 wherein the left and right ports are located forward of the plane.

5. A control air distributor for an air cushion vehicle having a bow, a stern, a left side, a right side, a fore-aft axis, and a yaw axis which comprises;

i. a first port, being an inlet port for control air flow, ii. a second port, being an outlet for propulsive air flow, iii. a third port, located approximately parallel to the fore-aft axis proximate to a plane which passes through the yaw axis and is perpendicular to the fore-aft axis, being an outlet for control air flow to the right side, and iv. a fourth port, located approximately parallel to the fore-aft axis proximate to the plane, being an outlet for control air flow to the left side, v. a first means for diverting air from the propulsive air flow to form a right side air flow, and vi. a second means for diverting air from the propulsive air flow to form a left side air flow, the first flow means for diverting air being mounted in a housing to allow continuous controlled movement from a first position to a second position and the second means for diverting air being mounted in the housing for continuous controlled movement from a first position to a second position, the first means for diverting air further being mounted for selectively diverting at least a portion of the control air flow from the second port to the third port to create the right side air flow, the second means for diverting air flow further being mounted for selectively diverting at least a portion of the control air flow from the second port to the fourth port to create the left side air flow, whereby control air flow can be selectively diverted to at least one of the third and fourth ports to create thrust.

6. The control air distributor of claim 5 which further comprises means for changing the direction of thrust of the first and second air flows, a first thrust direction changing means being located proximate to the third port and a second thrust direction changing means being located proximate to the fourth port, whereby activating at least one thrust direction changing means to change the thrust direction of the air flow from the ports to create a thrust which causes the rate of movement of the vehicle to change.

7. The control air distributor of claim 5 wherein the third and fourth ports are forward of the plane.

8. An air cushion vehicle having a bow, a stern, a left side, a right side, a fore-aft axis, and a yaw axis comprising:

a) a power assembly, the power assembly having at least a first opening, a second opening, and a third opening, the first opening being an inlet for air flow to a propeller, the second opening being a rear outlet for control air flow to a control air flow distributor, and the third opening being an outlet for air flow creating a lifting force, b) an engine driven propeller for creating an air flow to the second and third opening, c) an engine, the propeller being mounted for being driven by the engine, the engine being mounted in the power assembly, d) a control air flow distributor, mounted proximate to a plane which passes through the yaw axis and is perpendicular to the fore-aft axis, comprising a housing having:

i. a first port, being an inlet port for the control air flow, ii. a second port, being an outlet for propulsive air flow, iii. a third port, located approximately parallel to the fore-aft axis proximate to the plane, being an outlet for control air flow to the right side, and iv. a fourth port, located approximately parallel to the fore-aft axis proximate to the plane, being an outlet for control air flow to the left side, v. a first means for diverting air from the propulsive air flow to form a right side air flow, and vi. a second means for diverting air from the propulsive air flow to form a left side air flow, the first means for diverting air being mounted in the housing to allow continuous movement from a first position to a second position and the second means for diverting air being mounted in the housing for continuous movement from a first position to a second position, the first means for diverting air further being mounted for selectively diverting a least a portion of the control air flow from the second port to the third port, the second means for diverting air further being mounted for selectively diverting a least a portion of the control air flow from the second port to the fourth port, whereby right side and left side control air flow can be selectively produced, e) an air inflatable annular tube member, f) an air flow splitter means, the air flow splitter being mounted in the power assembly and positioned to direct a first portion of the air flow from the propeller to the second opening for control of the vehicle, and for directing a second portion of the air flow to the third opening for creating a lifting force, g) an enclosure member, the enclosure member enclosing the air inflatable annular tube member and having a plurality of peripherally positioned outlet openings in its lower surface and an engine assembly receiving opening in its upper surface, the engine assembly being positioned over the opening in the upper surface, the air splitter means directing the second portion of the air flow through the opening in the upper surface to the plurality of peripherally positioned outlet openings in the lower surface, h) a light-weight rigid or inflatable seat positioned downstream of the engine housing and forming a propulsion duct for the first portion of air flow exiting the control air distributor to form a propulsive air flow, the seat being secured to the enclosure member, and i) yaw control means.

9. The vehicle of claim 8 which further comprises means for changing the direction of thrust of the first and second control air flows, a first thrust direction changing means being located proximate to the third port and a second thrust direction changing means being located proximate to the fourth port whereby activating at least one thrust direction changing means to change the thrust direction of the air flow from the ports to create a thrust which causes the rate of movement of the vehicle to change.

10. The air cushion vehicle of claim 8 having a finger type skirt attached to the enclosure member.

11. The air cushion vehicle of claim 8 wherein the yaw control means comprises at least one rudder mounted proximate to propulsive air flow exiting the propulsion duct.

12. The air cushion vehicle of claim 8 wherein the yaw control means comprises left and right side thrust controllers located at the stern of the vehicle which utilize a portion of air diverted from the control air flow.

13. The air cushion vehicle of claim 8 wherein the yaw control means comprises left and right side thrust controllers located at the stern of the vehicle which utilize a portion of air diverted from the air flow creating the lifting force.

14. The air cushion vehicle of claim 8 wherein the yaw control means comprises an enclosed flow chamber mounted at the rear of the duct, the flow chamber comprising a series of coaxial annular members and a series of controllably inflatable tubes between the annular members, the coaxial annular members being enclosed in a flexible sheet to form the enclosed flow chamber which controllably diverts the propulsive air flow exiting the rear of the duct from rearward air flow to flow directed to a selected side port.

15. The method of operating an air cushion vehicle having a bow, a stern, a left side, a right side, a fore-aft axis, and a yaw axis; the vehicle further comprising:

a) a power assembly, the power assembly having at least a first opening, a second opening, and a third opening, the first opening being an inlet for air flow to a propeller, the second opening being a rear outlet for control air flow to a control air flow distributor, and the third opening being an outlet for air flow creating a lifting force, b) an engine driven propeller for creating an air flow to the second and third opening, c) an engine, the propeller being mounted for being driven by the engine, the engine being mounted in the power assembly, d) a control air flow distributor, mounted proximate to a plane which passes through the yaw axis and is perpendicular to the fore-aft axis, comprising a housing having:

i. a first port, being an inlet port for the control air flow, ii. a second port, being an outlet for propulsive air flow, iii. a third port, located approximately parallel to the fore-aft axis proximate to the plane, being an outlet for control air flow to the right side, and iv. a fourth port, located approximately parallel to the fore-aft axis proximate to the plane, being an outlet for control air flow to the left side, v. a first means for diverting air from the propulsive air flow to form a control air flow to the right side, and vi. a second means for diverting air from the propulsive air flow to form a control air flow to the left side, the first means for diverting air being mounted in the housing to allow continuous movement from a first position to a second position and the second flow means for diverting air being mounted in the housing for continuous movement from a first position to a second position, the first means for diverting air further being mounted for selectively diverting a least a portion of the control air flow from the second port to the third port, the second means for diverting air further being mounted for selectively diverting a least a portion of the control air flow from the second port to the fourth port, whereby right side and left side control air flow can be selectively produced, e) an air inflatable annular tube member, f) an air flow splitter means, the air flow splitter being mounted in the power assembly and positioned to direct a first portion of the air flow from the propeller to the second opening for control of the vehicle, and for directing a second portion of the air flow to the third opening for creating a lifting force, g) an enclosure member, the enclosure member enclosing the air inflatable annular tube member and having a plurality of peripherally positioned outlet openings in its lower surface and an engine assembly receiving opening in its upper surface, the engine assembly being positioned over the opening in the upper surface, the air splitter means directing the second portion of the air flow through the opening in the upper surface to the plurality of peripherally positioned outlet openings in the lower surface, h) a light-weight seat positioned downstream of the engine housing and forming a propulsion duct for the first portion of air flow exiting the control air distributor to form a propulsive air flow, the seat being secured to the enclosure member, and i) yaw control means which comprises the steps of:

A) applying air under pressure to the air inflatable annular tube until the inflatable annular tube and the enclosure member have reached a predetermined degree of turgidity, and B) evacuating air from the air inflatable annular tube until the inflatable annular tube and the enclosure member are essentially entirely collapsed, whereby the air cushion vehicle is reduced in its physical dimensions, essentially to the size of the engine assembly and seat.

16. The method of operating an air cushion vehicle of claim 15 having an inflatable seat comprising the steps of:

a) applying air under pressure to the air inflatable annular tube until the inflatable annular tube and the enclosure member have reached a predetermined degree of turgidity, b) applying air under pressure to the seat until the seat has reached a predetermined degree of turgidity, c) evacuating air from the air inflatable annular tube until the inflatable annular tube and the enclosure member are essentially entirely collapsed, and d) evacuating air from the seat until the seat is essentially collapsed, whereby the air cushion vehicle is reduced in its physical dimensions, essentially to the size of the engine assembly.

17. The method of claim 15 wherein the engine assembly, seat and enclosure are separated to form three components to facilitate shipping and handling of the vehicle when the vehicle is not in use.

18. The method of claim 16 wherein the engine assembly and the enclosure are separated to form two components to facilitate shipping and handling of the vehicle when the vehicle is not in use.

* * * * *